No. 755,837. Patented March 29, 1904.

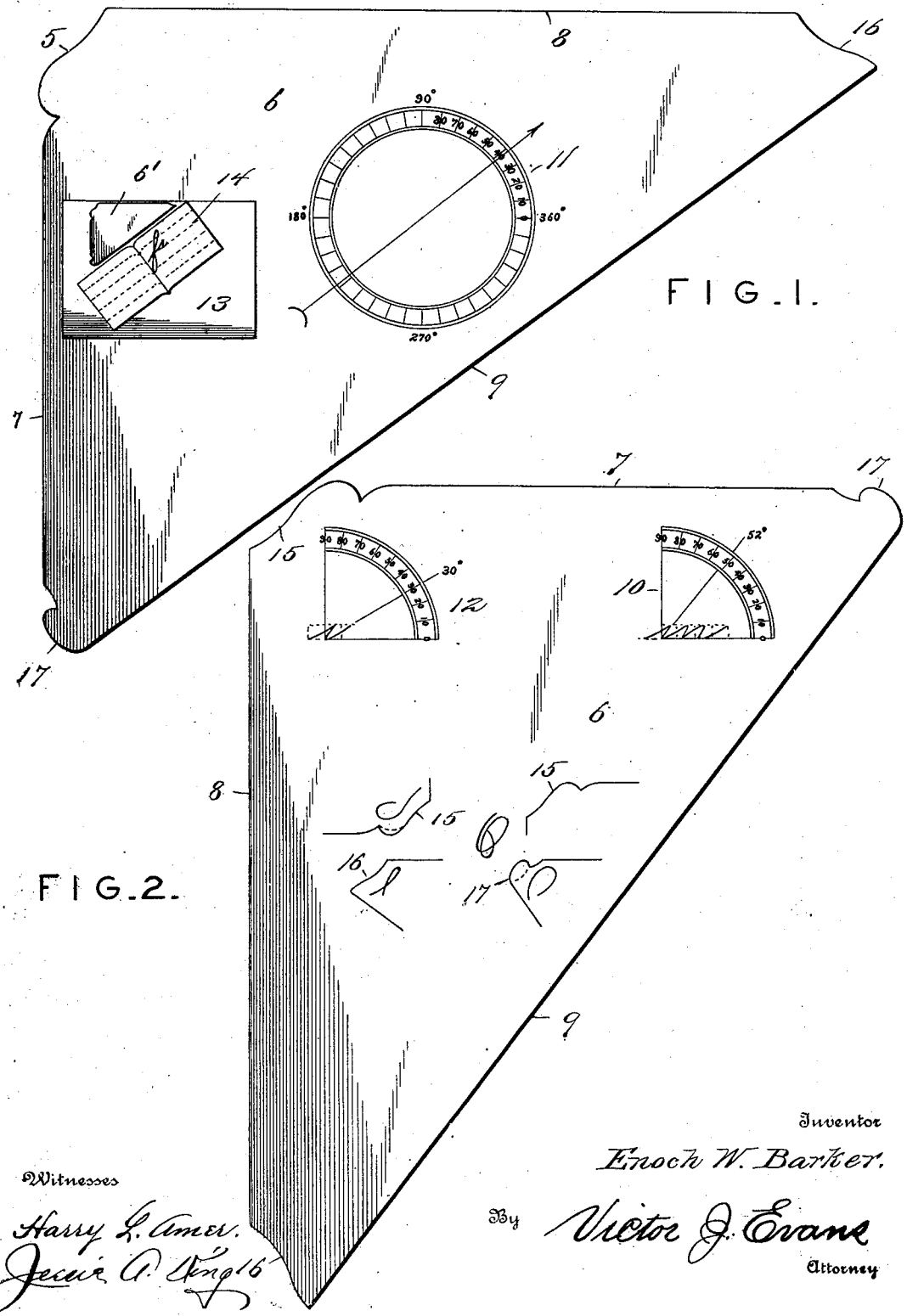

UNITED STATES PATENT OFFICE.

ENOCH W. BARKER, OF OAKLAND, CALIFORNIA.

EDUCATIONAL DEVICE.

SPECIFICATION forming part of Letters Patent No. 755,837, dated March 29, 1904.

Application filed October 24, 1903. Serial No. 178,382. (No model.)

*To all whom it may concern:*

Be it known that I, ENOCH W. BARKER, a citizen of the United States, residing at Oakland, in the county of Alameda and State of California, have invented new and useful Improvements in Educational Devices, of which the following is a specification.

This invention relates particularly to an educational device intended to teach penmanship, and comprises a chart having indices to determine or indicate the slants and curves required in writing and to show the proper positions to be assumed by the pupil in writing and in reading writing with respect to the paper or material being written on. The chart comprises a triangular figure, one of the angles being a right angle and the others being angles indicating inclinations in an established writing system, by comparison with which the slants of the main, connective, and base-line strokes incidental to the formation and connection of written letters are secured, as more fully hereinafter explained.

In the accompanying drawings, illustrative of the device, Figure 1 is a plan view of one side or the obverse. Fig. 2 is a plan view of the reverse.

Referring particularly to the drawings, 6 indicates a right-angled triangular chart, preferably made of cardboard or the like, having perpendicular edges 7 and 8 of such length, respectively, that the hypotenuse 9 forms an angle of fifty-two degrees with the shorter edge 7 and an angle of thirty-eight degrees with the longer edge 8, as indicated on the quadrantal and circular scales 10 and 11 printed on the chart. Also printed thereon is a quadrantal scale 12, on which is indicated an angle of thirty degrees.

In an approved system of writing fifty-two degrees is the proper angle for the main (usually the down) stroke of a letter and thirty degress is the proper angle for the connective strokes. Thus, taking the small letter "i" as the example, the first or up stroke is at thirty degrees, the next or main downstroke is at fifty-two degrees, and the final upstroke is at thirty degrees, as shown in the example printed on the chart. The angle of thirty-eight degrees is the slant or inclination which the base or ruled lines of the paper should bear to the front or base edge of the desk at which the pupil sits. An exemplification of this is printed on the chart, in which the desk is represented at 13, the chart thereon at 6', and the copy or writing book at 14. At each corner of the chart curves are described, that at 15 being the normal curve of a capital-stem, as illustrated in the reduced exemplification printed on the reverse of the chart and shown in Fig. 2, that at 16 being the curve of a loop or extended letter, and that at 17 being that of a reversed oval, as also exemplified on the reverse of the chart.

In use to teach the pupil to assume the front or proper position for writing the chart is placed with its rectangular sides parallel to the side and top of the desk and the copybook with its upper edge parallel to the hypotenuse, as shown in the printed diagram 6' in Fig. 1. The ruled lines of the book will then be at an angle of thirty-eight degrees to the base-line of the desk and in proper position for writing. The pupil will then involuntarily secure the main slant or ninety degrees while writing, which when the book is turned to the perpendicular or reading position will bring the main slant or strokes to the proper angle of fifty-two degrees, as illustrated on the quadrant 10. Direct comparison may be effected when the book is perpendicular with the quadrants 10 and 11 by reversing the chart, as in Fig. 2, and placing its rectangular edges parallel to the top and side of the book. The curves 15, 16, and 17 also afford ocular indications of the corresponding strokes and means for direct comparison with the finished work.

The charts are made in proper size for the use intended and for convenient carriage with or in the child's book and may contain appropriate directions for use printed thereon, of which the exemplifications referred to above are a part. A useful and instructive chart is thus produced for the purpose intended at small cost and suitable for individual possession and continual reference.

Having thus fully described the invention, what is claimed as new is—

1. A triangular writing-chart in which a portion of the edges are used to indicate the slants of strokes of written letters.

2. A writing-chart, having edges at an angle to each other, one edge being a hypotenuse with respect to the others and used as a guide to properly position the material to receive the written matter, a portion of the edges being used to indicate the slants of the strokes of written letters.

3. A writing-chart for application to a support having one edge for disposition in parallel relation to one edge of said support and another angular edge to serve as a guide in disposing the material to be written on, the said chart also having other edge structures to serve as guide means for indicating the slants of strokes of written letters.

4. A writing-chart having edge structures forming outlines of strokes of written letters.

5. A writing-chart having edges at angles and also provided with edge structures, a portion of the edges and said structures being used to indicate the slants of the strokes of written letters.

6. A right-angular triangular writing-chart whose hypotenuse is at an angle related to the slant of the strokes of written letters.

7. A writing-chart having an edge related to the angle of strokes of written letters and a corner indicating a stroke of a written letter.

8. A writing-chart having angular edges, a portion of the edges being used to designate the slants of strokes of written letters, and also provided with indicia thereon, a part of which is a small reproduction of the chart, for indicating the mode of application of the chart and the slants of the strokes of written letters.

In testimony whereof I affix my signature in presence of two witnesses.

ENOCH W. BARKER.

Witnesses:
FRED L. BUTLER,
FRED. M. CAMPBELL.